(12) United States Patent
Roosli et al.

(10) Patent No.: US 10,481,045 B2
(45) Date of Patent: Nov. 19, 2019

(54) ASSESSING PERFORMANCE OF AN HVAC SYSTEM

(71) Applicant: Honeywell International Inc., Morristown, NJ (US)

(72) Inventors: Philipp Anton Roosli, Niantic, CT (US); Michael Asmussen, New London, CT (US); Gregory W Howard, Morristown, NJ (US)

(73) Assignee: Honeywell International Inc., Morris Plains, NJ (US)

( * ) Notice: Subject to any disclaimer, the term of this patent is extended or adjusted under 35 U.S.C. 154(b) by 1017 days.

(21) Appl. No.: 14/247,994

(22) Filed: Apr. 8, 2014

(65) Prior Publication Data

US 2015/0286213 A1 Oct. 8, 2015

(51) Int. Cl.
| | | |
|---|---|---|
| *G01M 99/00* | (2011.01) | |
| *F24F 11/30* | (2018.01) | |
| *F24F 11/52* | (2018.01) | |
| *F24F 11/59* | (2018.01) | |
| *F24F 11/61* | (2018.01) | |

(52) U.S. Cl.
CPC ........... *G01M 99/005* (2013.01); *F24F 11/30* (2018.01); *F24F 11/52* (2018.01); *F24F 11/59* (2018.01); *F24F 11/61* (2018.01)

(58) Field of Classification Search
CPC .................................................. G01M 99/005
See application file for complete search history.

(56) References Cited

U.S. PATENT DOCUMENTS

| | | | |
|---|---|---|---|
| 6,536,675 | B1 | 3/2003 | Pesko et al. |
| 8,532,839 | B2 | 9/2013 | Drees et al. |
| 8,560,128 | B2 | 10/2013 | Ruff et al. |
| 8,620,841 | B1 | 12/2013 | Filson et al. |
| 2013/0060531 | A1* | 3/2013 | Burke ................. G06F 17/5004 703/1 |
| 2015/0022355 | A1* | 1/2015 | Pham .................... G08B 17/06 340/541 |

FOREIGN PATENT DOCUMENTS

| | | |
|---|---|---|
| WO | 2011109759 | 9/2011 |
| WO | 2012031279 | 3/2012 |

* cited by examiner

*Primary Examiner* — John E Breene
*Assistant Examiner* — Jeffrey C Morgan
(74) *Attorney, Agent, or Firm* — Seager Tufta & Wickhem LLP

(57) ABSTRACT

Methods, devices, and systems for assessing performance of a heating, ventilation, and air conditioning (HVAC) system are described herein. One method includes counting a number of interactions with an HVAC system associated with a multi-dwelling unit during a defined period of time, and assessing a performance of the HVAC system based on the number of interactions.

19 Claims, 2 Drawing Sheets

| UNIT | NUMBER OF INTERACTIONS |
|---|---|
| 2090 | 59 |
| 791 | 48 |
| 1141 | 37 |
| 2099 | 36 |
| 991 | 34 |
| 241 | 30 |
| 1097 | 29 |
| 237 | 28 |
| 1030 | 27 |
| 1131 | 26 |
| 1123 | 25 |
| 1172 | 25 |
| 2190 | 24 |
| 1120 | 24 |
| 1132 | 23 |
| 1112 | 23 |

ASSESSING PERFORMANCE OF AN HVAC SYSTEM

TECHNICAL FIELD

The present disclosure relates to methods, devices, and systems for assessing performance of an HVAC system.

BACKGROUND

A multi-dwelling unit, such as, for instance, a hotel room, can include a heating, ventilation, and air conditioning (HVAC) system for maintaining the environment (e.g., temperature, humidity, etc.) of the unit at a comfortable level for the occupant(s) (e.g., guest(s)) of the unit. The HVAC system can include, for example, HVAC equipment (e.g., fan, hot and/or cold water valve, exhaust grill, air conditioner, fan coil, etc.) and a controller (e.g., thermostat) that controls the operation of the HVAC equipment.

Deterioration and/or failure of the HVAC system (e.g., of the equipment of the HVAC system) of a multi-dwelling unit can result in an uncomfortable environment of the occupant(s) of the unit. However, such deterioration and/or failure may be subtle and difficult for the controller of the HVAC system to detect and/or measure. For example, deterioration and/or failure of the fan and/or air conditioner of the HVAC system may cause the fan and/or air conditioner to operate at an unnaturally high noise level, but the controller may not detect this problem if the fan and/or air conditioner are still able to maintain the desired temperature in the unit. As an additional example, deterioration and/or failure may result in excessive operation of the fan coil unit of the HVAC system, which may cause the air in the unit to become unnaturally dry, but again the controller may not detect this problem if the desired temperature in the unit is still maintained. As a result, it may be difficult for the operator (e.g., management) of the multi-dwelling unit to know when maintenance should be performed on the HVAC system of the unit.

DETAILED DESCRIPTION

Figure 1:
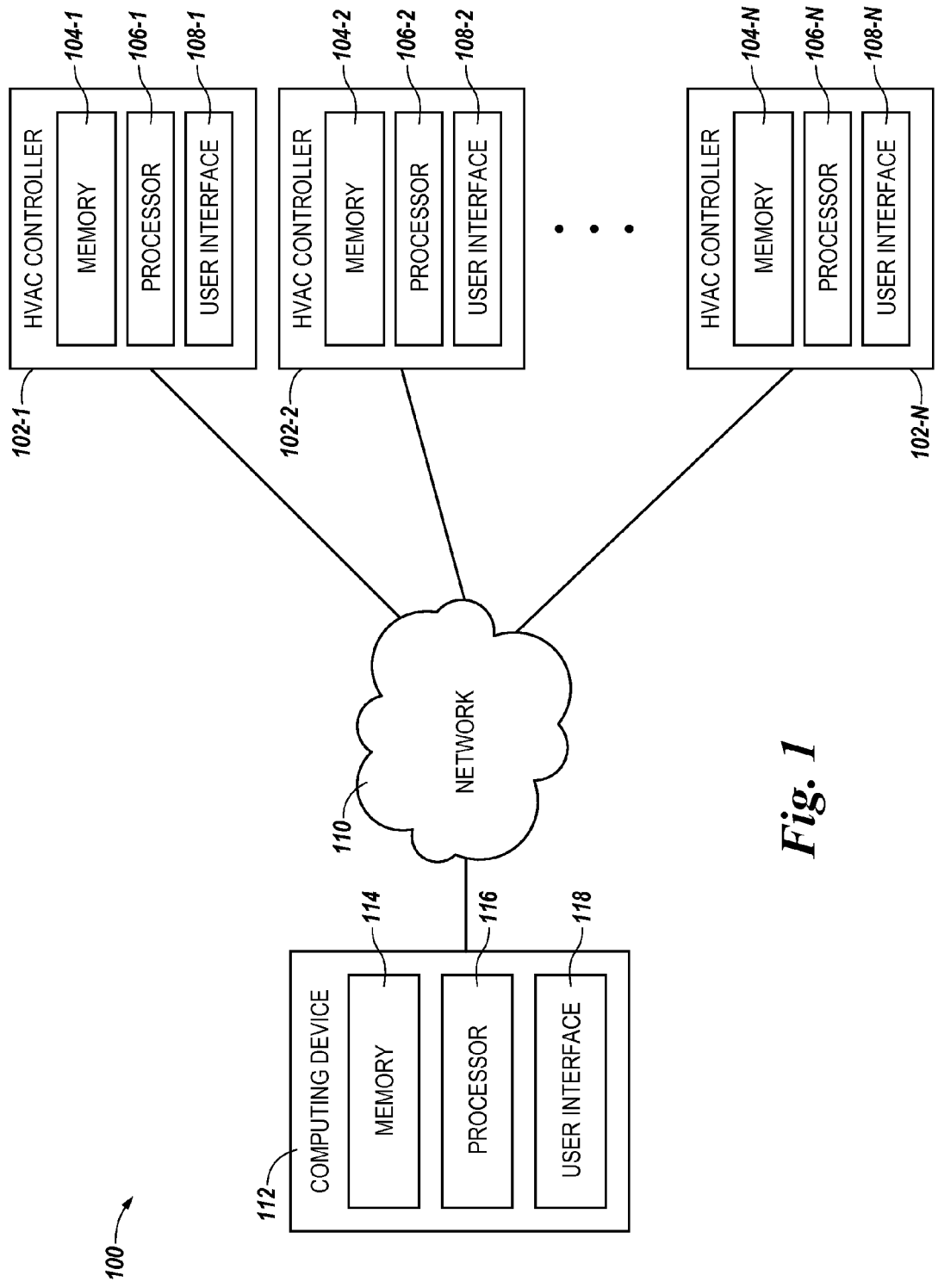
FIG. 1 illustrates a system for assessing performance of an HVAC system in accordance with one or more embodiments of the present disclosure.

Methods, devices, and systems for assessing performance of a heating, ventilation, and air conditioning (HVAC) system are described herein. For example, one or more embodiments include counting a number of interactions with an HVAC system associated with a multi-dwelling unit during a defined period of time, and assessing a performance of the HVAC system based on the number of interactions.

Embodiments of the present disclosure can indirectly detect and/or measure deteriorations and/or failures of the HVAC system (e.g., of the equipment of the HVAC system) of a multi-dwelling unit (e.g., a hotel room) that may otherwise be difficult or impossible to detect or measure. Accordingly, embodiments of the present disclosure can provide an indication to the operator (e.g., management) of the multi-dwelling unit of when maintenance should be performed on the HVAC system of the unit.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that mechanical, electrical, and/or process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of controllers" can refer to one or more controllers. Additionally, the designator "N", as used herein, particularly with respect to the reference numerals in the drawings, indicates that a number of the particular feature so designated can be included with a number of embodiments of the present disclosure.

FIG. 1 illustrates a system 100 for assessing performance of a heating, ventilation, and air conditioning (HVAC) system in accordance with one or more embodiments of the present disclosure. The HVAC system can be, for example, the HVAC system of a multi-dwelling unit, such as, for instance, a hotel room, and can include, for example, HVAC equipment (e.g., fan, hot and/or cold water valve, exhaust grill, air conditioner, fan coil, etc.) and a controller (e.g., thermostat) that controls the operation of the HVAC equipment, as will be further described herein.

As shown in FIG. 1, system 100 includes a number of HVAC controllers (e.g., thermostats) 102-1, 102-2, . . . , 102-N. Each controller 102-1, 102-2, . . . , 102-N can be associated with (e.g., be located in and/or control the HVAC equipment of) a different unit of a multi-dwelling property (e.g., building). For example, each controller 102-1, 102-2, . . . , 102-N can be associated with a different room of a hotel. That is, controller 102-1 can be associated with a first room of the hotel, controller 102-2 can be associated with a second room of the hotel, etc. However, embodiments of the present disclosure are not limited to a particular type of multi-dwelling unit. Further, in some embodiments, one or more of controllers 102-1, 102-2, . . . , 102-N can be associated with different units of different multi-dwelling properties (e.g., controller 102-1 can be associated with a unit of a first multi-dwelling property, controller 102-2 can be associated with a unit of a second multi-dwelling property, etc.).

As shown in FIG. 1, system 100 includes a computing device 112. Computing device 112 can be, for example, the computing device of an operator (e.g., manager) of the multi-dwelling property or properties. Further, computing device 112 can be, for example, a laptop computer, desktop computer, or a mobile device (e.g., smart phone, tablet, etc.), among other types of computing devices.

Computing device 112 and HVAC controllers 102-1, 102-2, . . . , 102-N can be coupled (e.g., communicate) via a network 110, as illustrated in FIG. 1 and will be further described herein. Network 110 can be a wired or wireless network, such as, for instance, a wide area network (WAN) such as the Internet, a local area network (LAN), a personal area network (PAN), a campus area network (CAN), or metropolitan area network (MAN), among other types of networks. As used herein, a "network" (e.g., network 110) can provide a communication system that directly or indirectly links two or more computers and/or peripheral devices and allows users to access resources on other computing devices and exchange messages with other users. A network can allow users to share resources on their own systems with other network users and to access information on centrally located systems or on systems that are located at remote locations. For example, network 110 can tie a number of computing devices together to form a distributed control network.

A network may provide connections to the Internet and/or to the networks of other entities (e.g., organizations, institutions, etc.). Users may interact with network-enabled software applications to make a network request, such as to get a file or print on a network printer. Applications may also communicate with network management software, which can interact with network hardware to transmit information between devices on the network.

As shown in FIG. 1, each respective HVAC controller 102-1, 102-2, . . . , 102-N includes a memory 104-1, 104-2, . . . , 104-N and a processor 106-1, 106-2, . . . , 106-N. Further, computing device 112 includes a memory 114 and a processor 116.

Memories 104-1, 104-2, . . . , 104-N and 114 can be any type of storage medium that can be accessed by processors 106-1, 106-2, . . . , 106-N and 116, respectively, to perform various examples of the present disclosure. For example, memories 104-1, 104-2, . . . , 104-N and 114 can be a non-transitory computer readable medium having computer readable instructions (e.g., computer program instructions) stored thereon that are executable by processors 106-1, 106-2, . . . , 106-N and 116, respectively, to perform various examples of the present disclosure. That is, processors 106-1, 106-2, . . . , 106-N and 116 can execute the executable instructions stored in memories 104-1, 104-2, . . . , 104-N and 114, respectively, to perform various examples of the present disclosure.

Memories 104-1, 104-2, . . . , 104-N and 114 can be volatile or nonvolatile memory. Memories 104-1, 104-2, . . . , 104-N and 114 can also be removable (e.g., portable) memory, or non-removable (e.g., internal) memory. For example, memories 104-1, 104-2, . . . , 104-N and 114 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memories 104-1, 104-2, . . . , 104-N and 114 are illustrated as being located in HVAC controllers 102-1, 102-2, . . . , 102-2-N and computing device 112, respectively, embodiments of the present disclosure are not so limited. For example, memories 104-1, 104-2, . . . , 104-N and 114 can also be located internal to another computing resource (e.g., enabling computer readable instructions to be downloaded over the Internet or another wired or wireless connection).

HVAC controllers 102-1, 102-2, . . . , 102-N and computing device 112 can be used to assess the performance of the HVAC system of each respective unit of the multi-dwelling property or properties. For example, the number of interactions with each respective HVAC controller 102-1, 102-2, . . . , 102-N during a defined period of time can be counted by the controllers and/or computing device 112, and the performance of each respective HVAC system can be assessed based on the counted number of interactions. In some embodiments, each respective HVAC controller 102-1, 102-2, . . . , 102-N can count the number of interactions with that controller (e.g., HVAC controller 102-1 can count the number of interactions with HVAC controller 102-1, HVAC controller 102-2 can count the number of interactions with HVAC controller 102-2, etc.) during the defined time period, and then transmit its counted number of interactions to computing device 112 via network 110. In some embodiments, computing device 112 can directly count the number of interactions with each respective HVAC controller 102-1, 102-2, . . . , 102-N during the defined time period via network 110.

The number of interactions with each respective HVAC controller 102-1, 102-2, . . . , 102-N may be the number of interactions with that controller made by a user of that controller. The user of each respective HVAC controller 102-1, 102-2, . . . , 102-N can be, for example, an occupant(s) (e.g., guest(s)) of the multi-dwelling unit associated with that controller.

As shown in FIG. 1, each respective HVAC controller 102-1, 102-2, . . . , 102-N includes a user interface 108-1, 108-2, . . . , 108-N The user of an HVAC controller 102-1, 102-2, . . . , 102-N can interact with the controller via a user interface of that controller. For example, the user of HVAC controller 102-1 can interact with controller 102-1 via user interface 108-1, the user of HVAC controller 102-2 can interact with controller 102-2 via user interface 108-2, etc. User interfaces 108-1, 108-2, . . . , 108-N can provide (e.g., display and/or present) information (e.g., data) to the user of the controller, and/or receive information (e.g., input) from the user of the controller. For example, user interfaces 108-1, 108-2, . . . , 108-N can be graphical user interfaces (GUIs) that can include a display (e.g., a screen) that can provide and/or receive information to and/or from the user of the controller. The display can be, for instance, a touch-screen (e.g., the GUI can include touch-screen capabilities). As an additional example, user interfaces 108-1, 108-2, . . . , 108-N can include a number of buttons and/or switches that can be pressed and/or flipped by the user. Embodiments of the present disclosure, however, are not limited to a particular type(s) of user interface.

An interaction with an HVAC controller 102-1, 102-2, . . . , 102-N can include a selection and/or adjustment (e.g., by the user of the controller) of a setting associated with the HVAC system of the multi-dwelling unit associated with that controller (e.g., an interaction with HVAC controller 102-1 can include a selection and/or adjustment of a setting associated with the HVAC system of the multi-dwelling unit associated with controller 102-1, an interaction with HVAC controller 102-2 can include a selection and/or adjustment of a setting associated with the HVAC system of the multi-dwelling unit associated with controller 102-2, etc.). As an example, an interaction with an HVAC controller 102-1, 102-2, . . . , 102-N can include an adjustment of a heating or cooling setting (e.g., increasing or decreasing the temperature of the heating or cooling setting) of the HVAC system of the multi-dwelling unit associated with that controller. As an additional example, an interaction with an HVAC controller 102-1, 102-2, . . . , 102-N can include an adjustment of a fan setting (e.g., turning the fan on or off) of the HVAC system of the multi-dwelling unit associated with that controller. As an additional example, an interaction with an HVAC controller 102-1, 102-2, . . . , 102-N can include an adjustment of an AUTO mode (e.g., turning the AUTO mode on or off) of the HVAC system of the multi-dwelling unit associated with that controller.

In some embodiments, if the amount of time between two interactions with an HVAC controller 102-1, 102-2, . . . , 102-N is below a threshold amount of time, the two interactions can be counted as a single (e.g., only one) interaction. That is, multiple interactions with the controller that occur within a short period of time (e.g., two minutes) can be counted as a single transaction.

In some embodiments, only the interactions with each respective HVAC controller 102-1, 102-2, . . . , 102-N that occur during the defined period of time are counted (e.g., interactions that occur outside of the defined period of time are not counted). The defined period of time can correspond to, for example, a time of day, such as, for instance a time of day when the occupant(s) of the multi-dwelling unit associated with that controller would typically be asleep (e.g., 1:00 AM to 5:00 AM). As an additional example, the defined period of time can correspond to an occupancy period of the multi-dwelling unit associated with that controller (e.g., the defined period of time can take into account when the occupant(s) of the unit enter and/or leave the unit). For instance, the defined period of time can include a period of time before or after the multi-dwelling unit is occupied (e.g., a period of time while the unit is unoccupied), and/or a period of time before or after the multi-dwelling unit is unoccupied (e.g., a period of time while the unit is occupied). As an example, the defined period of time can begin three hours after the occupant(s) of the multi-dwelling unit enter the unit, and end two hours before the occupant(s) leave the unit.

Computing device 112 can assess the performance of the HVAC system of each respective unit of the multi-dwelling property or properties based on the counted number of interactions with each respective HVAC controller 102-1, 102-2, . . . , 102-N during the defined period of time, and provide an indication (e.g., to the operator of computing device 112) to perform maintenance on (e.g., an indication of whether maintenance should be performed on and/or is needed for) one or more of the HVAC systems based on the assessed performances. For example, the greater the number of interactions with an HVAC controller 102-1, 102-2, . . . , 102-N during the defined period of time (e.g., as compared to the number of interactions with the other controllers during the defined period of time), the more likely it is that the HVAC system (e.g., the equipment of the HVAC system) of that respective multi-dwelling unit has deteriorated and/or failed and maintenance should be performed.

As an example, computing device 112 can assign a point value to each of the number of interactions with each respective HVAC controller 102-1, 102-2, . . . , 102-N during the defined period of time, and assess the performance of the HVAC system of each respective unit of the multi-dwelling property or properties based on the point values assigned to each of the number of interactions. For instance, computing device 112 can sum the point values assigned to each of the number of interactions with each respective HVAC controller 102-1, 102-2, . . . , (e.g., determine the sum of the point values assigned to each interaction with HVAC controller 102-1, determine the sum of the point values assigned to each interaction with HVAC controller 102-2, etc.) over the course of a particular amount of time (e.g., a month, a year, etc.), and assess the performance of each respective HVAC system based on the point value sum for each respective HVAC controller.

The point value assigned to an interaction may depend on the type and/or characteristics of the interaction. For example, a simple and/or basic interaction, such as a temperature adjustment or turning a fan on or off, may be assigned a single point. However, an additional (e.g., higher) point value, such as, for instance, three points, may be assigned to interactions that restore a prior (e.g., previously selected) setting and/or select a new setting. For example, if the mode of the HVAC system is initially set at AUTO but is switched to OFF during the defined period of time, this interaction can be assigned a single point. However, if during the defined period of time the HVAC system is switched back on to AUTO mode, this interaction can be assigned a higher point value.

The assessment of the performance of the of the HVAC system of each respective unit of the multi-dwelling property or properties can include a comparison of the counted number of interactions with each respective HVAC controller 102-1, 102-2, . . . , 102-N during the defined period of time (e.g., a comparison of the point value sums for each respective controller). For example, the performance of each respective HVAC system can be ranked based on the counted number of interactions with each respective controller (e.g., based on the point value sums for each respective controller). An example of such a ranking will be further described herein (e.g., in connection with FIG. 3).

Computing device 112 can then provide an indication to perform maintenance on (e.g., an indication of whether maintenance should be performed on and/or is needed for) one or more of the HVAC systems based on the assessed (e.g., ranked) performances of each respective HVAC system. For example, computing device 112 can provide an indication to perform maintenance on the HVAC system or systems having the highest number of interactions (e.g., the highest point value sum(s)).

The indication to perform maintenance can be provided to the operator of computing device 112 via user interface 118 illustrated in FIG. 1. User interface 118 can provide (e.g., display and/or present) information (e.g., an indication to perform maintenance) to the operator of computing device 112, and/or receive information (e.g., input) from the operator of computing device 112. For example, user interface 118 can be a graphical user interface (GUI) that can include a display (e.g., a screen) that can provide and/or receive information to and/or from the operator of computing device 112. The display can be, for instance, a touch-screen (e.g., the GUI can include touch-screen capabilities).

Figures 2, 3:
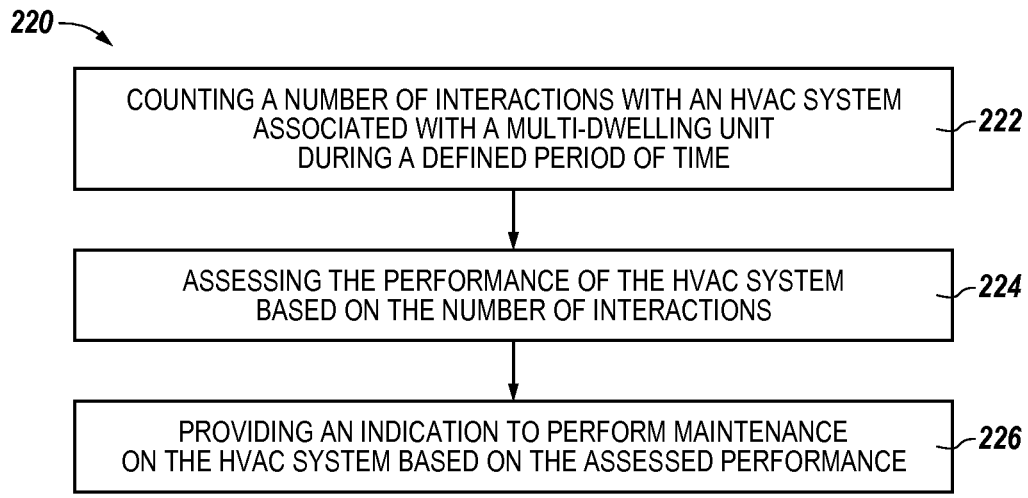
FIG. 2 illustrates a method for assessing performance of an HVAC system in accordance with one or more embodiments of the present disclosure.
FIG. 3 is a table illustrating an example of a ranking of the performance of the HVAC systems of a number of multi-dwelling units in accordance with one or more embodiments of the present disclosure.

FIG. 2 illustrates a method 220 for assessing performance of an HVAC system in accordance with one or more embodiments of the present disclosure. Method 220 can be performed by, for example, HVAC controllers 102-1, 102-2, . . . , 102-N and/or computing device 112 previously described in connection with FIG. 1.

At block 222, method 220 includes counting a number of interactions with an HVAC system associated with a multi-dwelling unit during a defined period of time. The interactions with the HVAC system can be, for example, interactions with a controller of the HVAC system, such as, for instance, HVAC controllers 102-1, 102-2, . . . , 102-N, as previously described herein (e.g., in connection with FIG. 1). The multi-dwelling unit can be, for example, a hotel room, as previously described herein (e.g., in connection with FIG. 1). The defined period of time can correspond to, for example, a time of day, such as a time of day when the occupant(s) of the multi-dwelling unit would typically be asleep, or to an occupancy period of the multi-dwelling unit, as previously described herein (e.g., in connection with FIG. 1).

To further normalize the number of interactions over a particular period of time, the interaction number can be divided by the ratio of time periods during which the unit was occupied during the time period divided by the number of days in the particular period of time. This can compensate for variability if different units are used (e.g., occupied) at different rates. Further, in some embodiments, the time period for a unit can be digitized, and instances where a controller (e.g., thermostat) is not touched during the interval can be differentiated from instances where the controller is touched one or more times. That is, each time period for each unit can produce either zero or one interaction count. This summed number can be normalized by dividing it by the occupancy percentage for the unit over the time period.

At block 224, method 220 includes assessing the performance of the HVAC system based on the number of interactions. As an example, a point value can be assigned to each of the number of interactions, and the performance of the HVAC system can be assessed based on the point values (e.g., the sum of the point values) assigned to each of the number of interactions, as previously described herein (e.g., in connection with FIG. 1). Further, the number of interactions (e.g., the point value sum) can be compared to (e.g., ranked versus) the number of interactions with (e.g., point value sums for) other HVAC systems associated with other multi-dwelling units, as previously described herein (e.g., in connection with FIG. 1) and as will be further described herein (e.g., in connection with FIG. 3).

At block 226, method 220 includes providing an indication to perform maintenance on the HVAC system based on the assessed performance. For example, an indication to perform maintenance on the HVAC system may be provided if the number of interactions with the HVAC system (e.g., the point value sum) is high (e.g., as compared to the other HVAC systems associated with the other multi-dwelling units. The indication can be provided to an operator of computing device 112, as previously described herein (e.g., in connection with FIG. 1).

FIG. 3 is a table 330 illustrating an example of a ranking of the performance of the HVAC systems of a number of multi-dwelling units in accordance with one or more embodiments of the present disclosure. Each of the multi-dwelling units may be located in the same property, or one or more of the multi-dwelling units may be located in different properties, as previously described herein. Table 330 can be provided (e.g., displayed) to an operator of computing device 112 previously described in connection with FIG. 1.

In the example illustrated in FIG. 3, the performance of the HVAC systems of the multi-dwelling units is ranked based on (e.g., in descending order of) the number of interactions with each respective HVAC system during a defined period of time. For instance, in the example illustrated in FIG. 3, the HVAC system of unit (e.g., room number) 2090 had 59 interactions during the defined period of time, the HVAC system of unit 791 had 48 interactions during the defined period of time, the HVAC system of unit 1141 had 37 interactions during the defined period of time, etc. The interactions with each respective HVAC system can be, for example, interactions with a controller of each respective HVAC system, such as, for instance, HVAC controllers 102-1, 102-2, . . . , 102-N, as previously described herein (e.g., in connection with FIG. 1). The defined period of time can correspond to, for example, a time of day, such as a time of day when the occupant(s) of the multi-dwelling unit would typically be asleep, or to an occupancy period of the multi-dwelling unit, as previously described herein (e.g., in connection with FIG. 1). Further, although not shown in FIG. 3, in some embodiments the performance of the HVAC systems of the units can be ranked based on (e.g., in descending order of) the sum of point values assigned to each of the number interactions with each respective HVAC system, as previously described herein.

Table 330 can provide an indication of which HVAC system or systems may need maintenance. For example, the HVAC system(s) of the multi-dwelling unit(s) at or near the top of the ranking of table 330 may need maintenance (e.g., because the performance of the HVAC systems of the units are ranked in descending order of the number of interactions with each respective HVAC system). For instance, in the example illustrated in FIG. 3, maintenance should be performed on the HVAC systems of multi-dwelling units 2090 and 791, because the HVAC systems of those units had the highest number of interactions during the defined time period, and hence are at the top of the ranking of table 330.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for assessing performance of a heating, ventilation, and air conditioning (HVAC) system, comprising:

counting, by a computing device, a number of interactions with a thermostat of an HVAC system associated with a multi-dwelling unit during a defined period of time, wherein the number of interactions include at least one of:
    an adjustment of a heating or cooling setting of the thermostat of the HVAC system;
    an adjustment of a fan setting of the thermostat of the HVAC system; and
    an adjustment of an AUTO mode setting of the thermostat of the HVAC system; and
assessing, by the computing device, a performance of the HVAC system based on the number of interactions; and
detecting or measuring a deterioration or failure of the HVAC system.

2. The method of claim 1, wherein:
the number of interactions are made by a user of the thermostat of the HVAC system; and
the number of interactions include selecting a setting associated with the Thermostat of the HVAC system.

3. The method of claim 1, wherein the method includes normalizing the number of interactions by a ratio of the multi-dwelling unit being occupied over the defined period of time.

4. The method of claim 1, wherein the defined period of time corresponds to a time of day.

5. The method of claim 1, wherein the defined period of time corresponds to an occupancy period of the multi-dwelling unit.

6. The method of claim 1, wherein counting the number of interactions includes counting two interactions as a single interaction when an amount of time between the two interactions is below a threshold amount of time.

7. The method of claim 6, wherein the threshold amount of time is the entire defined period of time.

8. The method of claim 1, wherein assessing the performance of the HVAC system includes ranking the performance of the HVAC system versus a performance of an additional HVAC system associated with an additional multi-dwelling unit based on a point value assigned to the HVAC system and the additional HVAC system.

9. The method of claim 8, wherein the method includes initiating the a performing of maintenance on at least one of the HVAC system and the additional HVAC system based on the ranked performances.

10. The method of claim 8, wherein the multi-dwelling unit is located in a first property and the additional multi-dwelling unit is located in a second property different than the first property.

11. A machine-readable non-transitory medium storing instructions, executable by a machine to cause the machine to:
    count a number of interactions with a thermostat of a heating, ventilation, and air conditioning (HVAC) system associated with a multi-dwelling unit during a defined period of time, wherein the number of interactions include at least one of:
        an adjustment of a heating or cooling setting of the thermostat of the HVAC system;
        an adjustment of a fan setting of the thermostat of the HVAC system; and
        an adjustment of an AUTO mode setting of the thermostat of the HVAC system;
    assign a point value to each of the number of interactions;
    assess a performance of the HVAC system based on the point values assigned to each of the number of interactions; and
    detect or measure a deterioration or failure of the HVAC system.

12. The medium of claim 11, further comprising instructions executable to:
    sum the point values assigned to each of the number of interactions; and
    assess the performance of the HVAC system based on the sum.

13. The medium of claim 11, wherein the defined period of time includes a period of time that is at least one of before and after the multi-dwelling unit is occupied.

14. The medium of claim 11, wherein the defined period of time includes a period of time that is at least one of before and after the multi-dwelling unit is unoccupied.

15. The medium of claim 11, further comprising instructions executable to assign an additional point value to an interaction that restores a prior setting associated with the thermostat of the HVAC system.

16. The medium of claim 11, further comprising instructions executable to assign an additional point value to an interaction that includes selecting a new setting associated with the thermostat of the HVAC system.

17. The medium of claim 16, wherein the additional point value is higher than the point value.

18. A system comprising a processing resource in communication with a non-transitory computer-readable medium, wherein the computer-readable medium contains a set of instructions and wherein the processing resource is designed to execute the set of instructions to:
    count a number of interactions with a thermostat of a heating, ventilation, and air conditioning (HVAC) system associated with a multi-dwelling unit during a defined period of time, wherein the period of time corresponds to a time of day, wherein the number of interactions include at least one of:
        an adjustment of a heating or cooling setting of the thermostat of the HVAC system;
        an adjustment of a fan setting of the thermostat of the HVAC system; and
        an adjustment of an AUTO mode setting of the thermostat of the HVAC system;
    assess a performance of the HVAC system based on the number of interactions.

19. The system of claim 18, wherein:
the HVAC system is located in a first property; and
assessment of the performance of the HVAC system includes comparing the number of interactions to a number of interactions with a thermostat of an additional HVAC system associated with an additional multi-dwelling unit located in a second property.

* * * * *